April 8, 1930.  F. E. BURDEN  1,753,644
BIPROXIMAL TOOTH AND INTERLOCKING KEY
Filed Nov. 28, 1927
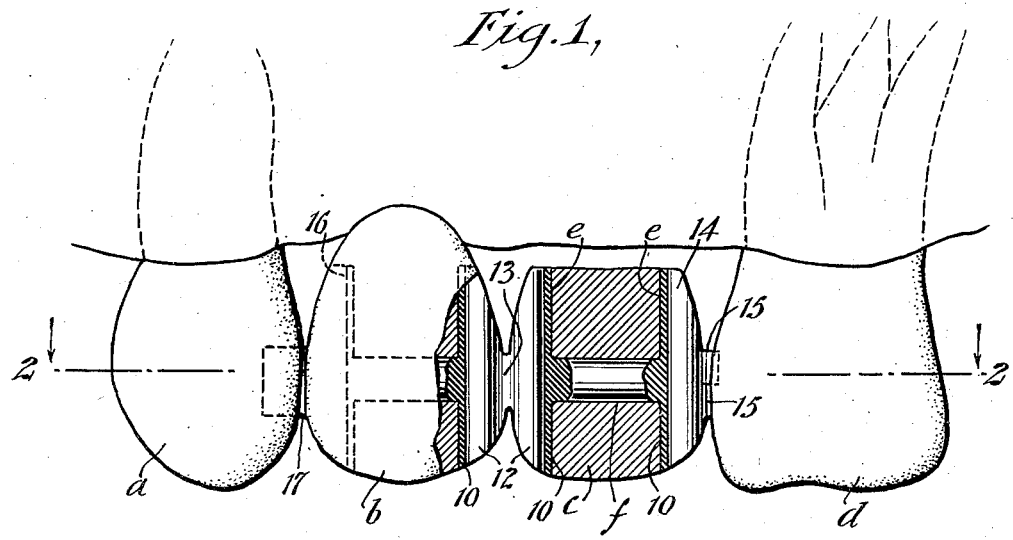
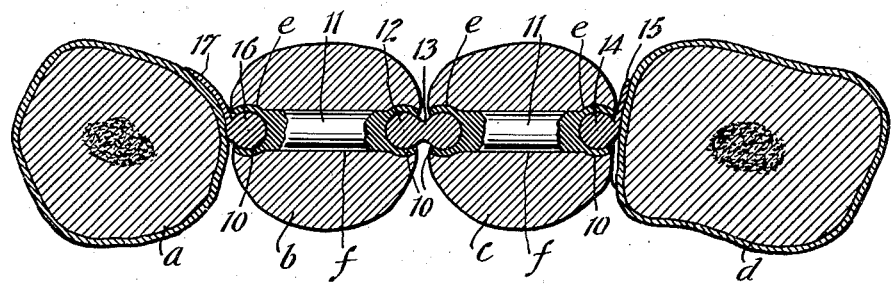
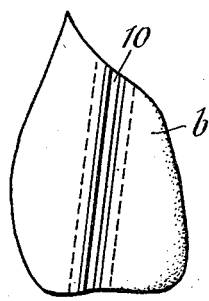
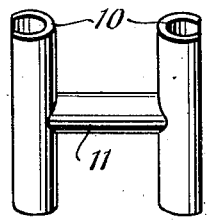
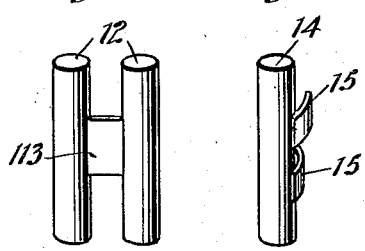
WITNESSES
INVENTOR
Fred Earle Burden
BY
ATTORNEY Patented Apr. 8, 1930

1,753,644

UNITED STATES PATENT OFFICE

FRED EARLE BURDEN, OF MONCTON, NEW BRUNSWICK, CANADA

BIPROXIMAL TOOTH AND INTERLOCKING KEY

Application filed November 28, 1927. Serial No. 236,245.

My invention relates to a substitute for the natural human tooth and a device for attaching one of these substitute teeth to another substitute tooth (biproximal), and a device for attaching the substitute tooth or teeth to any of the recognized abutments, either singly to supply one missing tooth or assembled to supply several missing teeth.

The general object of my invention is to provide an artificial and novel biproximal tooth whereby to promote cleanliness as well as to give a natural appearance to the artificial tooth. My invention also makes each part interchangeable and replaceable, as well as doing away with the necessity of taking an impression for fixed bridgework. It also provides for assembling the teeth directly in the mouth, as well as providing a tooth distinguishable from the artificial teeth now generally used so that all surfaces of the teeth are natural in form and function. The assembly directly in the mouth promotes an esthetic effect and failure to produce a proper fit is rare, and proper occlusion and bite are easily obtained. My improved tooth is also characterized by the fact that it can be used both in fixed bridgework and removable bridgework and dentures.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a view partly in front elevation and partly in vertical section showing a plurality of teeth embodying my invention;

Figure 2 is a horizontal section on the line 2—2 of Figure 1;

Figure 3 is an elevation at the distal or mesial side of my improved tooth;

Figure 4 is a perspective view of an abutting couple employed in carrying out my invention;

Figure 5 is a perspective view of a connecting element between two teeth before the said connecting element is worked into final form after being associated with the two adjacent teeth; and Figure 6 is a perspective view of the post securing members that may be employed for connecting one of the end teeth in a series with the adjacent tooth.

The illustrated example of my invention shows the same embodied in a pair of teeth between two abutment teeth. The abutment teeth are indicated by the letters $a$ and $d$, and the intermediate teeth embodying the invention are indicated by the letters $b$ and $c$.

In accordance with my invention each tooth $b$ or $c$ is formed with vertical grooves $e$ and a transverse connecting space $f$ at the mesial or distal surfaces. In each vertical groove or longitudinal recess $e$ is fitted a bushing 10 of semi-circular or other desired cross section, the bushings of a pair pertaining to each tooth being connected in the illustrated example by a transverse member 11 fitting the transverse space $f$. Adjacent bushings 10 at the proximal surfaces or mesial surface and distal surface of the teeth $b$, $c$ said bushings are connected by an element comprising two posts 12 with an intermediate web 13. Said web 13 initially has the form indicated at 113 in Figure 5, the form as shown in Figure 2 being that of said element after it has been worked and the connection completed in finished form.

At surfaces of each tooth, $b$, $c$ which proximate adjacent abutment teeth $a$, $d$, a post is provided with a member thereon to be made fast by any of the approved methods to said abutment teeth $a$, $d$. At the right of Figure 2 I have shown the distal surface of tooth $c$ connected to adjacent tooth $d$ by a post 14 having oppositely disposed flanges 15 conforming to the opposed mesial surface of the abutment tooth $d$. Similarly, the other abutment tooth $a$ has secured to it at its distal surface the flange 17 of post 16, said posts 14 and 16 being accommodated in the adjacent sockets 10.

By the described arrangement any given tooth $b$, $c$ may be removed and replaced, the connection by the posts 12 and web 13, as well as the connection due to the posts 14 and 16 being adapted to be slid from the corresponding sockets 10. The posts 12, 14 and 16 initially have the form shown in Figures 5 and 6, being completely cylindrical to the end, but after being worked the proximal surfaces of the said posts are contoured to conform to the outlines of the tooth.

The tooth as an article of manufacture for esthetic purposes will be manufactured without bushing 10 and member 11 (Figure 4) as well as with said bushing 10 and member 11. In the former case there will be no space f.

The grooves g are shown vertical but the grooves may take any desired direction in practice on the mesial surface and distal surface of each tooth b or c, it being understood that b or c represents not only the bicuspids shown in the example but all of the teeth in each jaw, which as an article of manufacture will be made to substitute any tooth or all teeth in the human dentition.

The matter of the grooves e, one on the mesial surface and one on the distal surface of each biproximal tooth, is a distinctive feature of my invention. It is these grooves together with the inter-locking keys which constitute the unique feature of biproximal suspension. It is these grooves and these inter-locking keys which make it possible to assemble bridgework directly into the mouth, it being unnecessary to take an impression. In supplying missing teeth either singly or severally to substitute teeth lost from any position in the mouth, it is only necessary for the operator to fix into position the abutment or abutments he elects, which abutments carry my abutment inter-locking key, 14 and 15, Figure 6. Then select suitable biproximal teeth to fill the space, adjust them, and cement into position on either two of Figure 6 (one mesial and one distal), or two of Figure 6 (one mesial and one distal), and one or more of Figure 5, according to the number of biproximal teeth necessary, or one of Figure 6 may be used on an abutment either mesial or distal, and the remaining groove whether it contains a bushing or not (and this is determined by the class of case) closed by working Figure 6 bar member and trimming 15—15 to contour. In the case of flat bite molars in the lower jaw, for example, it may be necessary to attach Figure 6 so that post 14 may run from buccal to lingual (cheek to tongue). Therefore, the grooves e would be made in the tooth supplied to the dentist or the one he may fashion using the frame Figure 4 to run from cheek to tongue, and the biproximal tooth would slip on 14 from cheek to tongue, and where several teeth are being assembled, as in Figure 5, they may be attached by connections running in any desired direction on the mesial surface or the distal surface.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims. As, for example, without departing from the principle of my invention the bushing, as an article of manufacture, might assume a triangular, square or other cross-sectional form and, of course, Figures 5 and 6 would likewise be modified. Thus the biproximal tooth with or without Figure 4, as an article of manufacture, may contain grooves on the mesial surface or distal surface (i. e. proximal surfaces) which traverse in any desired course, vertically, horizontally or otherwise.

I claim:

1. An artificial tooth formed with two sockets one each at the mesial and distal surfaces thereof, two intermediately joined bushings in said sockets presenting longitudinal openings at the outer sides, posts in said bushings, and means on the posts to fasten the same to the crowns of abutment teeth, said sockets consisting of biproximal grooves traversing the mesial and distal surfaces for the entire distance presented by said surfaces between two opposite surfaces.

2. An artificial tooth formed with two intermediately joined bushings, one each at the mesial and distal surface thereof presenting longitudinal openings at the outer side, posts in said sockets, and means on the posts to fasten the same to the crowns of abutment teeth, said sockets consisting of grooves traversing the mesial and distal surfaces for the entire distance presented by said surfaces between two opposite surfaces.

3. As an article of manufacture, multiple combinations of artificial teeth formed with intermediately joined bushings at the mesial and distal surfaces, intermediately joined posts accommodated in said intermediately joined bushings, and means on the outer posts at the proximal surfaces thereof to attach the posts to the crowns of abutting teeth, said sockets consisting of biproximal grooves traversing the mesial and distal surfaces for the entire distance presented by said surfaces between two opposite surfaces.

4. As an article of manufacture, a tooth having intermediately joined bushings at the mesial and distal surfaces, posts slidably secured within said bushings, and means on said posts to attach the same to adjacent teeth, said tooth having two grooves only, each groove traversing the entire distance on the mesial and distal surfaces, respectively, between two opposite surfaces.

5. As an article of manufacture, a tooth having intermediately joined bushings at the mesial and distal surfaces, posts slidably secured within said bushings, and means on said posts to hold the same to adjacent teeth, together with a flexible and adjustable connecting member between the two posts.

6. A multiple combination of artificial teeth, each tooth having a groove on its mesial surface and a groove on its distal surface running the entire distance between two opposite surfaces thereof, intermediately joined bushings within said grooves, posts in said bushings, and a flexible and adjustable connecting element between the said teeth at the proximal surfaces thereof.

7. A multiple combination of artificial teeth, each tooth having a groove on its mesial surface and a groove on its distal surface running the entire distance between two opposite surfaces thereof, intermediately joined bushings within said grooves, posts in said bushings, a flexible and adjustable connecting element between said teeth at the proximal surfaces thereof.

Signed at Moncton, in the Province of New Brunswick and Dominion of Canada this 23d day of November, A. D. 1927.

FRED EARLE BURDEN.